US012315668B2

(12) United States Patent
Nakashima

(10) Patent No.: US 12,315,668 B2
(45) Date of Patent: May 27, 2025

(54) ELECTRONIC COMPONENT

(71) Applicant: Murata Manufacturing Co., Ltd., Kyoto-fu (JP)

(72) Inventor: Yasunari Nakashima, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/451,016

(22) Filed: Aug. 16, 2023

(65) Prior Publication Data

US 2023/0395307 A1 Dec. 7, 2023

Related U.S. Application Data

(63) Continuation of application No. 16/950,704, filed on Nov. 17, 2020, now Pat. No. 11,769,620, which is a (Continued)

(30) Foreign Application Priority Data

Aug. 10, 2016 (JP) ................................ 2016-157422

(51) Int. Cl.
*H01F 27/29* (2006.01)
*H01F 17/00* (2006.01)
(Continued)

(52) U.S. Cl.
CPC ......... *H01F 27/29* (2013.01); *H01F 17/0013* (2013.01); *H01F 27/28* (2013.01); (Continued)

(58) Field of Classification Search
CPC ...... H01F 27/29; H01F 17/0013; H01F 27/28; H01F 27/292; H01F 27/36
(Continued)

(56) References Cited

U.S. PATENT DOCUMENTS

| | | | |
|---|---|---|---|
| 6,076,253 | A | 6/2000 | Takayama et al. |
| 6,377,151 | B1 | 4/2002 | Takayama et al. |

(Continued)

FOREIGN PATENT DOCUMENTS

| | | | |
|---|---|---|---|
| CN | 1701401 | A | 11/2005 |
| CN | 101657938 | A | 2/2010 |

(Continued)

OTHER PUBLICATIONS

An Office Action mailed by the Chinese Patent Office on Apr. 23, 2019, which corresponds to Chinese Patent Application No. 201710646190.8 and is related to U.S. Appl. No. 15/656,277; with English language translation.

(Continued)

*Primary Examiner* — Shawki S Ismail
*Assistant Examiner* — Joselito S. Baisa
(74) *Attorney, Agent, or Firm* — Studebaker Brackett PLLC

(57) ABSTRACT

The electronic component includes an element body having a mounting surface, an upper surface opposing the mounting surface, a first side surface, and a second side surface adjacent to the first side surface, and an outer conductor including a first portion extending along the first side surface and embedded in the element body so as to be exposed from the first side surface. The element body has a first chamfered portion at a corner portion connecting the upper surface and the first side surface, and a length of the first chamfered portion is longer than a thickness of the first portion of the outer conductor in a direction substantially orthogonal to the first side surface.

10 Claims, 3 Drawing Sheets

Related U.S. Application Data continuation of application No. 15/656,277, filed on Jul. 21, 2017, now Pat. No. 10,878,992.

(51) Int. Cl.
*H01F 27/28* (2006.01)
*H01F 27/36* (2006.01)

(52) U.S. Cl.
CPC ......... *H01F 27/292* (2013.01); *H01F 27/363* (2020.08); *H01F 27/36* (2013.01)

(58) Field of Classification Search
USPC .................................................. 336/192, 200
See application file for complete search history.

(56) References Cited

U.S. PATENT DOCUMENTS

| | | | | |
|---|---|---|---|---|
| 6,791,444 | B1 | 9/2004 | Masuda et al. | |
| 8,570,708 | B2 | 10/2013 | Itagaki et al. | |
| 8,810,350 | B2 | 8/2014 | Seko | |
| 9,595,386 | B2 * | 3/2017 | You | H01G 4/248 |
| 9,984,804 | B2 | 5/2018 | Park et al. | |
| 10,026,538 | B2 | 7/2018 | Takezawa | |
| 10,269,482 | B2 | 4/2019 | Yoneda et al. | |
| 10,847,307 | B1 | 11/2020 | Tajima et al. | |
| 10,878,992 | B2 | 12/2020 | Nakashima | |
| 11,024,455 | B2 | 6/2021 | Sekiguchi et al. | |
| 2006/0158824 | A1 * | 7/2006 | Kawajiri | H01G 4/40 361/272 |
| 2008/0013252 | A1 | 1/2008 | Nakano et al. | |
| 2009/0158800 | A1 | 6/2009 | Takada | |
| 2011/0260821 | A1 | 10/2011 | Yamada et al. | |
| 2012/0075766 | A1 | 3/2012 | Nishioka et al. | |
| 2012/0194031 | A1 * | 8/2012 | Ogawa | H01G 4/005 336/200 |
| 2013/0015937 | A1 | 1/2013 | Seko | |
| 2013/0187744 | A1 | 7/2013 | Seko et al. | |
| 2014/0292142 | A1 | 10/2014 | Nishisaka et al. | |
| 2014/0375412 | A1 * | 12/2014 | Seko | H01F 27/292 336/200 |
| 2015/0009003 | A1 * | 1/2015 | Ozawa | H01F 17/0013 336/200 |
| 2015/0179323 | A1 | 6/2015 | Uemoto et al. | |
| 2015/0340155 | A1 | 11/2015 | Fukunaga et al. | |
| 2015/0371757 | A1 | 12/2015 | Takezawa | |
| 2016/0141102 | A1 | 5/2016 | Tseng et al. | |
| 2016/0217909 | A1 | 7/2016 | Park et al. | |
| 2016/0276087 | A1 | 9/2016 | Yan et al. | |
| 2016/0372261 | A1 * | 12/2016 | Ozawa | H01F 17/0013 |
| 2017/0103848 | A1 | 4/2017 | Yoneda et al. | |
| 2018/0068780 | A1 * | 3/2018 | Shimoda | H01F 27/292 |
| 2018/0096769 | A1 * | 4/2018 | Sekiguchi | H01F 41/04 |
| 2018/0197674 | A1 * | 7/2018 | Yoshinaka | H01F 27/2885 |

FOREIGN PATENT DOCUMENTS

| | | | | | |
|---|---|---|---|---|---|
| CN | 102347133 | A | * | 2/2012 | H01G 4/012 |
| CN | 102623178 | A | | 8/2012 | |
| JP | 2011035147 | A | | 2/2011 | |
| JP | 2012-79870 | A | | 4/2012 | |
| JP | 2014039036 | A | | 2/2014 | |
| JP | 2018113309 | A | * | 7/2018 | H01F 17/0013 |

OTHER PUBLICATIONS

An Office Action; “Notification of Reasons for Refusal,” Mailed by the Japanese Patent Office on Jan. 22, 2019, which corresponds to Japanese Patent Application No. 2016-157422 and is related to U.S. Appl. No. 15/656,277; with English language translation.

* cited by examiner

ELECTRONIC COMPONENT

CROSS REFERENCE TO RELATED APPLICATIONS

This application is a Continuation of U.S. patent application Ser. No. 16/950,704 filed Nov. 17, 2020, which is a Continuation of U.S. patent application Ser. No. 15/656,277 filed Jul. 21, 2017, which claims benefit of priority to Japanese Patent Application 2016-157422 filed Aug. 10, 2016, the entire content of which is incorporated herein by reference.

TECHNICAL FIELD

The present disclosure relates to an electronic component.

BACKGROUND

There is an electronic component disclosed in Japanese Unexamined Patent Application Publication No. 2014-39036 as an existing electronic component. This electronic component has an element body including a bottom surface, a coil provided in the element body, and an outer electrode provided to the element body and electrically connected to the coil. The outer electrode is embedded in the element body so as to be exposed from the bottom surface of the element body.

Although photosensitive resin is used as the element body for the coil disclosed in Japanese Unexamined Patent Application Publication No. 2014-39036, there is a coil for which glass or a ceramic material is used instead of the photosensitive resin as the element body.

Recently, by miniaturization of the electronic components being advanced, the electronic components according to such a coil disclosed in Japanese Unexamined Patent Application Publication No. 2014-39036 are also mass-produced, for example, with a length×a width of about 1.0 mm×0.5 mm, and a height equal to or smaller than about 1.0 mm, which are called 1005.

SUMMARY

However, as miniaturization of the electronic components progresses, there has been a problem that failure such as cracking easily arises in a corner portion of the electronic component during mounting.

Accordingly, it is an object of the present disclosure to provide an electronic component capable of reducing occurrence of failure during mounting.

An electronic component according to a preferred mode of the present disclosure, in order to solve the above-described problem, includes:

an element body having a mounting surface, an upper surface opposing the mounting surface, a first side surface, and a second side surface adjacent to the first side surface; and an outer conductor including a first portion extending along the first side surface and embedded in the element body so as to be exposed from the first side surface, wherein the element body has a first chamfered portion at a corner portion connecting the upper surface and the first side surface, and a length L1 of the first chamfered portion is longer than a thickness Le of the first portion of the outer conductor in a direction substantially orthogonal to the first side surface.

According to the electronic component configured as described above, occurrence of failure during mounting can be reduced.

Additionally, in a preferred aspect of the electronic component, the element body has a first mounting side chamfered portion at a corner portion connecting the mounting surface and the first side surface, and a length L2 of the first mounting side chamfered portion is shorter than the length L1 in a direction substantially orthogonal to the first side surface.

Additionally, in a preferred aspect of the electronic component, the element body has a second chamfered portion at a corner portion connecting the second side surface and the upper surface, and a second mounting side chamfered portion at a corner portion connecting the second side surface and the mounting surface, and a length L4 of the second mounting side chamfered portion is shorter than a length L3 of the second chamfered portion in a direction substantially orthogonal to the second side surface.

In the electronic component according to the preferred aspect described above, tilting during mounting can be suppressed.

Additionally, in a preferred aspect of the electronic component, the outer conductor is provided such that an end portion of the outer conductor is distanced from the second side surface, the element body has the second chamfered portion at the corner portion connecting the second side surface and the upper surface, and a gap x between the end portion and the second side surface is smaller than the length L3 of the second chamfered portion in a direction substantially orthogonal to the second side surface.

Additionally, in a preferred aspect of the electronic component, the gap x is equal to or smaller than about 30 μm.

In the electronic component according to the preferred aspect described above, a small-sized electronic component in which occurrence of cracks in the corner portion is suppressed can be provided.

Additionally, in a preferred aspect of the electronic component, the thickness Le is equal to or smaller than about 30 μm.

Additionally, in a preferred aspect of the electronic component, the outer conductor is embedded in the element body so as to be exposed across the first side surface and the mounting surface.

Additionally, in a preferred aspect of the electronic component, the element body is formed from glass or a ceramic material.

Additionally, in a preferred aspect of the electronic component, two of the first side surfaces are present so as to oppose each other, the outer conductors are present on one side and another side of the first side surfaces, respectively, and both the outer conductors on the one side and the other side are embedded in the element body so as to be exposed across the first side surfaces and the mounting surface.

In the electronic component according to the preferred aspect described above, the occurrence of the failure during mounting can be further reduced.

Additionally, a preferred aspect of the electronic component further includes a coil having a substantially spiral shape embedded in the element body and connecting the outer conductor on the one side and the outer conductor on the other side.

In the electronic component according to the preferred aspect described above, a coil component capable of reducing the occurrence of the failure during mounting can be provided.

Additionally, in a preferred aspect of the electronic component, the coil has a substantially helical shape.

In the electronic component according to the preferred aspect described above, a coil component with an improved Q value while reducing the occurrence of the failure during mounting can be provided.

Additionally, in a preferred aspect of the electronic component, the element body has a configuration in which a plurality of insulating layers are laminated in a direction substantially orthogonal to the second side surface, and the coil has coil conductor layers wound on the insulating layers and a via conductor passing through the insulating layers and connecting end portions of the coil conductor layers to each other.

In the electronic component according to the preferred aspect described above, a multilayer type coil component capable of reducing the occurrence of the failure during mounting can be provided.

As described above, according to preferred embodiments of the present disclosure, an electronic component capable of reducing the failure during mounting can be provided.

Other features, elements, characteristics and advantages of the present disclosure will become more apparent from the following detailed description of preferred embodiments of the present disclosure with reference to the attached drawings.

DETAILED DESCRIPTION

As described above, as miniaturization of the electronic components progresses, there has been a problem that failure such as cracks in an electronic component, tilting, deviating, or standing of the electronic component, or the like during mounting easily arises. Hitherto, in order to solve such a problem, an improvement of a mounting machine or the like has been focused on, for example.

However, the inventors of the present application have found that the failure of the electronic component during mounting can be reduced by improvement on the electronic component side, as a result of earnest investigation.

To describe in detail, for example, in the case where an electronic component having a substantially hexahedron shape which has a mounting surface, an upper surface opposing the mounting surface, and four side surfaces includes an outer conductor embedded in an element body so as to be exposed from a certain side surface, the inventors have found a relationship between the side surface from which the outer conductor is exposed and a location where cracks are produced. Specifically, cracks are easily produced in the vicinity of a corner portion connecting the side surface from which the outer conductor is exposed and the upper surface. Note that, in the present application, the corner portion refers to a portion separating from imaginary surfaces obtained by extending main surfaces of the side surface and the upper surface. However, portions which separate from the main surface once and then return on the main surface again, such as substantially fine irregularities or the like, for example, are not included in the corner portion.

Investigating further while focusing on this point, in the case where the outer conductor embedded in the element body so as to be exposed from a certain side surface is included, it has been found that, after heat treatment (firing) of the element body, the corner portion of the side surface from which the outer conductor is exposed and the upper surface has a shape substantially protruding further toward an upper side than the upper surface. The cracks in the corner portion of the electronic component during mounting are produced due to concentration of loads of a mounter nozzle when mounting on the substantially protruding projecting portion.

Furthermore, it has been found that there is a relationship, which will be described in detail later, between a width of the protruding of the corner portion of the side surface from which the outer conductor is exposed and the upper surface and a thickness of the outer conductor, after the heat treatment (firing) of the element body.

The present disclosure has been made on the basis of the above-described knowledge originally obtained by the inventors of the present application.

Hereinafter, embodiments according to a preferred mode of the present disclosure will be described with reference to the drawings.

First Embodiment

Figure 1:
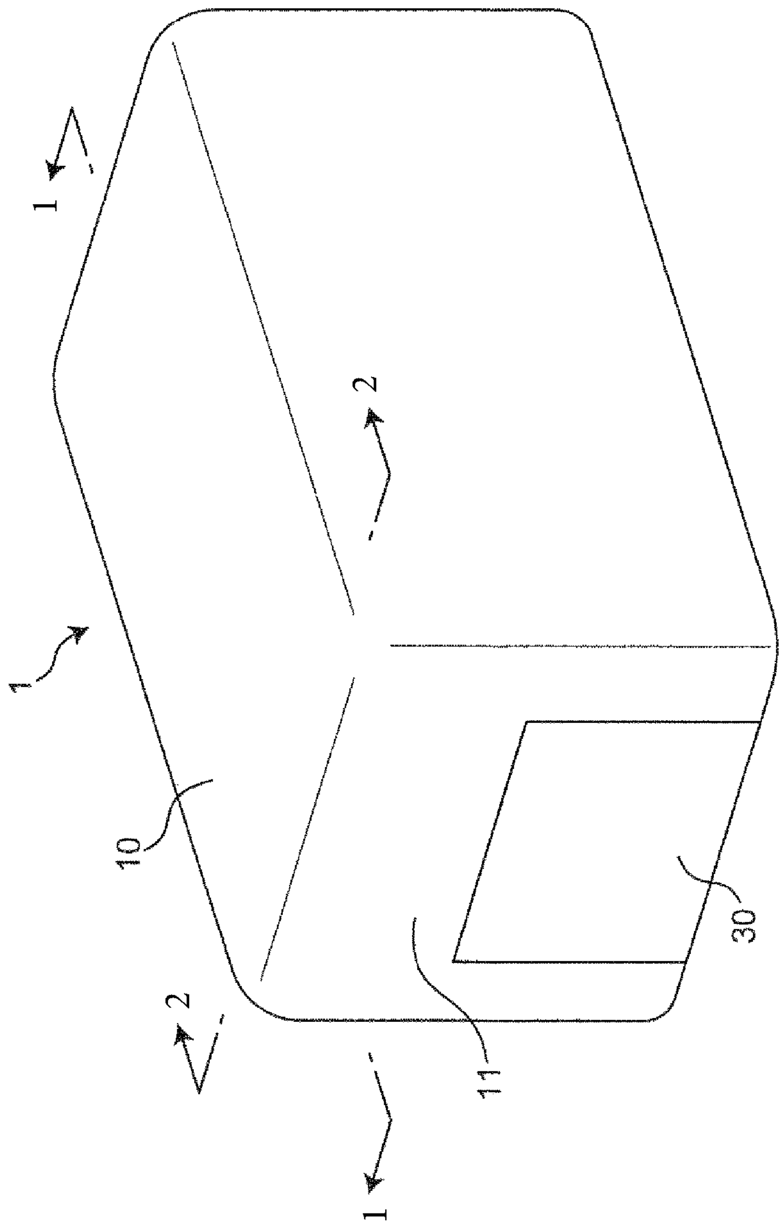
FIG. 1 is a perspective view of an electronic component according to a first embodiment.
Figure 2A:
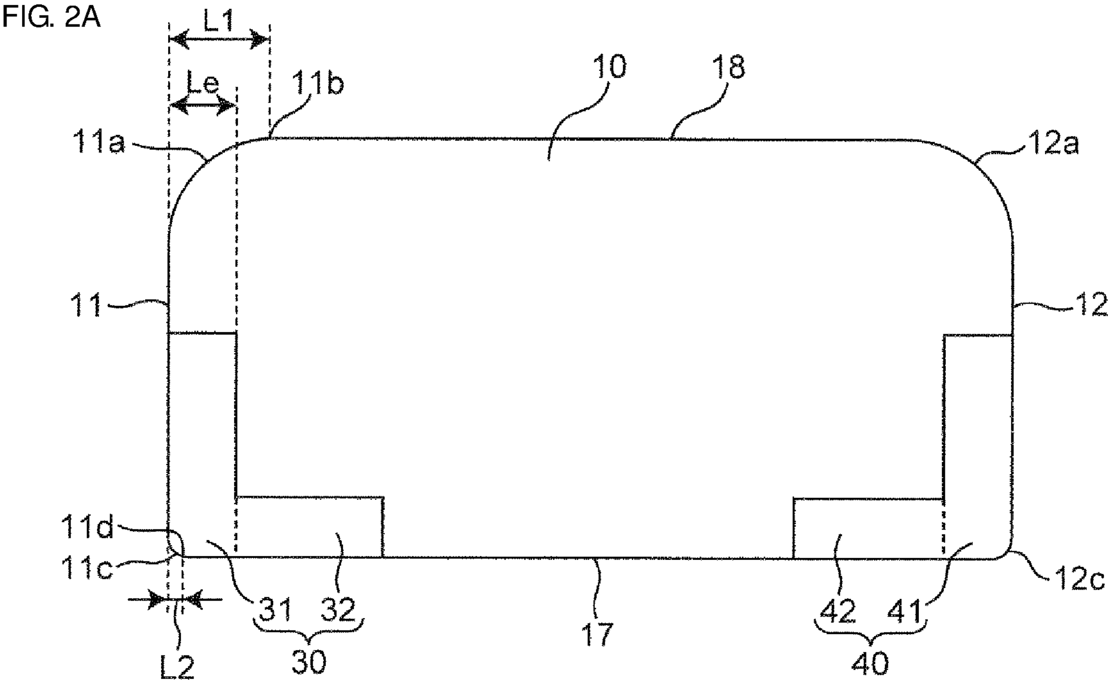
FIG. 2A is a cross-sectional view taken along a line 1-1 in FIG. 1.
Figure 2B:
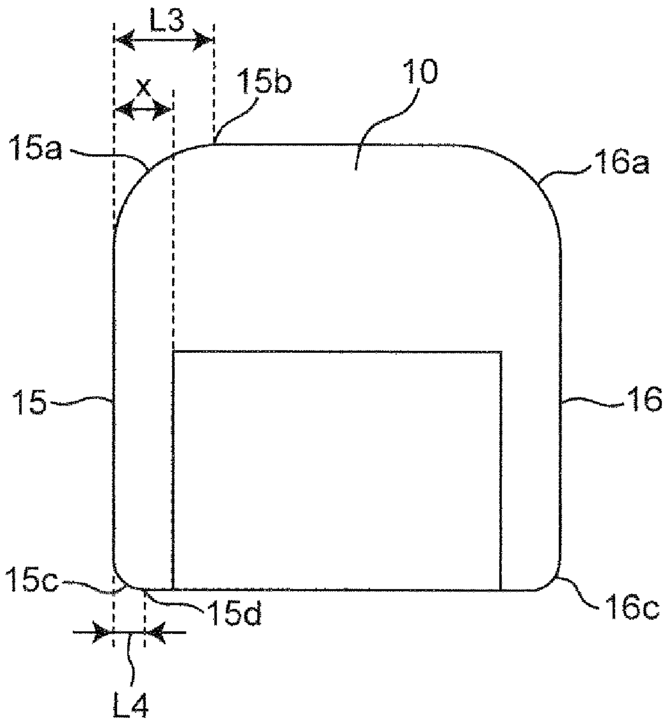
FIG. 2B is a cross-sectional view taken along a line 2-2 in FIG. 1.

FIG. 1 is a perspective view of an electronic component 1 according to a first embodiment, FIG. 2A is a cross-sectional view taken along a line 1-1 in FIG. 1, and FIG. 2B is a cross-sectional view taken along a line 2-2 in FIG. 1. Note that, although FIG. 2A and FIG. 2B are cross-sectional views, hatching is omitted in order to clearly illustrate a dimension and a location relationship.

The electronic component 1 according to the first embodiment includes an element body 10 and outer conductors 30 and 40 embedded in the element body, as illustrated in FIG. 1 and FIG. 2A. The element body 10 has a substantially rectangular parallelepiped shape, and has a mounting surface 17, an upper surface 18 opposing the mounting surface 17, two first side surfaces 11 and 12 opposing each other, and two second side surfaces 15 and 16 adjacent to the first side surfaces 11 and 12 and opposing each other. The outer conductor 30 is exposed from the first side surface 11, the outer conductor 40 is exposed from the first side surface 12. Additionally, the outer conductors 30 and 40 are respectively exposed from the mounting surface 17 as well, and have a cross-sectional shape of a substantially L shape as illustrated in FIG. 2A. Here, "a cross-sectional shape of a substantially L shape" means that the outer conductors 30 and 40 bend at end portions of the mounting surface 17 and are embedded in the element body so as to be exposed across the first side surfaces 11 and 12, respectively, and the mounting surface 17, and includes the case where the cross-sectional shape is a substantially inverted L shape as well. As illustrated in FIG. 2A, the outer conductors 30 and 40 include first portions 31 and 41, and second portions 32 and 42, respectively. The first portions 31 and 41 extend along the first side surfaces 11 and 12 and are exposed from the first side surfaces 11 and 12, respectively. The second portions 32 and

42 extend along the mounting surface 17 from end portions of the first portions 31 and 41, respectively, on the mounting surface 17 side and are exposed from the mounting surface 17. Note that, the outer conductors 30 and 40 are not exposed from the upper surface 18.

The electronic component 1 according to the first embodiment has a first chamfered portion 11*a* at a corner portion connecting the upper surface 18 and the first side surface 11, and has a first chamfered portion 12*a* at a corner portion connecting the upper surface 18 and the first side surface 12, as illustrated in FIG. 1 and FIG. 2A. Additionally, as illustrated in FIG. 1 and FIG. 2B, the electronic component has a second chamfered portion 15*a* at a corner portion connecting the upper surface 18 and the second side surface 15, and has a second chamfered portion 16*a* at a corner portion connecting the upper surface 18 and the second side surface 16. The first chamfered portions 11*a* and 12*a* and the second chamfered portions 15*a* and 16*a* are R-chamfered portions which have substantially curved surface shapes expanding toward outer side portions.

Note that, although the upper surface 18 is a substantially flat surface in the drawings, the upper surface 18 may have some substantial irregularities. Additionally, in the present application, the "chamfered portion" refers to a portion entering into the inner side of the element body more than imaginary surfaces obtained by extending the main surfaces of the side surface and the upper surface at a corner portion.

Here, particularly, in the electronic component 1 according to the first embodiment, as illustrated in FIG. 2A, in a direction substantially orthogonal to the first side surface 11, a length L1 of the first chamfered portion 11*a* is longer than a thickness Le of the first portion 31 of the outer conductor 30. Additionally, the same applies to a relationship between the first chamfered portion 12*a* on the first side surface 12 side and the outer conductor 40.

Note that, in the present specification, the outer conductor refers to a portion combining the first portion extending along the first side surface and the second portion extending along the mounting surface, and does not include a wiring conductor projected from the first portion or the second portion. Additionally, in the case where a thickness of the first portion of the outer conductor differs depending on locations, the thickness Le of the first portion of the outer conductor refers to an average thickness of the first portion.

The length L1 of the first chamfered portions 11*a* and 12*a* is defined as described above in a relationship with the thickness Le of the first portions 31 and 41 of the outer conductors 30 and 40 for the following reason.

For example, when the electronic component 1 in which the outer conductor 30 formed from a metal is embedded in the element body 10 formed from an inorganic material such as a ceramic material or glass is manufactured, a resin binder in which inorganic material particles are dispersed is molded so as to embed a metal material having a predetermined shape (a portion to be the outer conductor after firing) therein, and the molded body is then subjected to firing. In the case where the first chamfered portions 11*a* and 12*a* are not formed, because a shrinkage rate of the resin binder including inorganic material particles is larger than a shrinkage rate of the metal material, substantial irregularities are produced on the element body 10 along the upper surface 18, when firing. Specifically, of the corner portions connecting the upper surface 18 and the first side surfaces 11 and 12, in areas above the first portions 31 and 41 of the outer conductors 30 and 40, the shrinkage rate becomes smaller than other portions by embedding the first portions 31 and 41. Accordingly, substantially protruding shapes with a width approximately the same as the thickness Le are formed with respect to the upper surface 18 when firing, substantially projecting portions projecting from the upper surface 18 in the vicinity of the corner portions are thus produced. In this case, as described above, loads due to a mounter nozzle concentrate on the substantially projecting portion when mounting, and thus there is possibility that cracks or the like are produced in the vicinity of the corner portions of the electronic component.

As opposed to this, in the electronic component 1, the length L1 of the first chamfered portions 11*a* and 12*a* is longer than the thickness Le. In other words, areas above the first portions 31 and 41 of the outer conductors 30 and 40 are chamfered and lower than the upper surface 18. With this, when firing, due to a difference between the shrinkage rate of the resin binder including the inorganic material particles and the shrinkage rate of the metal material, even if portions other than the areas above the first portions 31 and 41 of the element body 10 largely contract, it is possible to reduce or suppress that the areas above the first portions 31 and 41 project with respect to the upper surface 18.

The electronic component 1 according to the first embodiment includes the first chamfered portions 11*a* and 12*a* configured as described above, the concentration of the load by the mounter nozzle on the corner portions of the side surface from which the outer conductor is exposed and the upper surface, when mounting, can be reduced, and thus occurrence of failure during mounting can be reduced.

Here, the thickness Le of the first portions 31 and 41 of the outer conductors is preferably equal to or smaller than about 30 μm, more preferably equal to or smaller than about 20 μm. Decreasing the thickness Le of the outer conductor in this manner makes it possible to satisfy L1>Le even in the first chamfered portions 11*a* and 12*a* in which the length L1 is short. Accordingly, an electronic component capable of reducing occurrence of cracks can be provided with higher manufacturing efficiency, and thus the occurrence of the failure during mounting can be reduced with ease. The thickness Le of the first portions 31 and 41 of the outer conductors is preferably equal to or greater than about 3 μm, taking into consideration variation when manufacturing, for example, and preferably equal to or greater than about 5 μm in particular.

Additionally, as illustrated in FIG. 2A, the electronic component 1 according to the first embodiment has a first mounting side chamfered portion 11*c* at a corner portion connecting the mounting surface 17 and the first side surface 11, and has a first mounting side chamfered portion 12*c* at a corner portion connecting the mounting surface 17 and the first side surface 12. Furthermore, as illustrated in FIG. 2B, the electronic component 1 has a second mounting side chamfered portion 15*c* at a corner portion connecting the mounting surface 17 and the second side surface 15, and has a second mounting side chamfered portion 16*c* at a corner portion connecting the mounting surface 17 and the second side surface 16. The first mounting side chamfered portions 11*c* and 12*c* and the second mounting side chamfered portions 15*c* and 16*c* are R-chamfered portions which have substantially curved surface shapes expanding toward outer side portions. The mounting surface 17 is substantially flat excluding the first mounting side chamfered portions 11*c* and 12*c*, the second mounting side chamfered portion 15*c*, and the second mounting side chamfered portion 16*c*. This substantially flat portion is referred to as a substantially flat mounting surface. Note that, the mounting surface 17 may have substantial irregularities.

In the electronic component 1 according to the first embodiment, the first mounting side chamfered portions 11*c* and 12*c* and the second mounting side chamfered portions 15*c* and 16*c* on the mounting surface 17 side are smaller than the first chamfered portions 11*a* and 12*a* and the second chamfered portions 15*a* and 16*a* on the upper surface side. Specifically, as illustrated in FIG. 2A, in a direction substantially orthogonal to the first side surface 11, a length L2 of the first mounting side chamfered portion 11*c* is shorter than the length L1 of the first chamfered portion 11*a*. Additionally, the same also applies to a relationship between the first mounting side chamfered portion 12*c* and the first chamfered portion 12*a* on the first side surface 12 side. Additionally, as illustrated in FIG. 2B, in a direction substantially orthogonal to the second side surface 15, a length L4 of the second mounting side chamfered portion 15*c* is shorter than a length L3 of the second chamfered portion 15*a*. The same also applies to a relationship between the second mounting side chamfered portion 16*c* and the second chamfered portion 16*a* on the second side surface 16 side.

In this manner, in the electronic component 1 according to the first embodiment, the first mounting side chamfered portions 11*c* and 12*c* and the second mounting side chamfered portions 15*c* and 16*c* on the mounting surface side are smaller than the first chamfered portions 11*a* and 12*a* and the second chamfered portions 15*a* and 16*a* on the upper surface side, respectively, and thus tilting of the electronic component 1 during mounting can be prevented.

Note that, in the electronic component 1 according to the first embodiment, the outer conductors are embedded in the element body so as to be exposed across the first side surfaces 11 and 12, respectively, and the mounting surface 17, and thus, as will be described later, the first mounting side chamfered portions 11*c* and 12*c* on the mounting surface side can be made smaller than the first chamfered portions 11*a* and 12*a* on the upper surface side with ease. Accordingly, the electronic component 1 can reduce the occurrence of the failure during mounting with ease.

Furthermore, in the electronic component 1 according to the first embodiment, the outer conductor 30 is provided such that the end portion thereof on the second side surface 15 side is distanced from the second side surface 15, and in a direction substantially orthogonal to the second side surfaces 15 and 16, a gap x between the end portion thereof and the second side surface 15 is smaller than the length L3 of the second chamfered portion 15*a*.

With this, as will be described later, the second mounting side chamfered portions 15*c* and 16*c* on the mounting surface side can be made smaller than the second chamfered portions 15*a* and 16*a* on the upper surface side with ease. Accordingly, the electronic component 1 can reduce the occurrence of the failure during mounting with ease. Here, the gap x between the end portion of the outer conductor 30 on the second side surface 15 side and the second side surface 15 is preferably equal to or smaller than about 30 μm, and more preferably equal to or smaller than about 20 μm.

Decreasing the gap x in this manner makes it possible to satisfy $x<L3$ even in the second chamfered portions 15*a* and 16*a* in which the length L3 is short, the electronic component capable of reducing the occurrence of the cracks can be provided with higher manufacturing efficiency, and thus the occurrence of the failure during mounting can be reduced with ease. The gap x is preferably equal to or greater than about 3 μm, for example, taking into consideration variations when manufacturing, and preferably equal to or greater than about 5 μm in particular.

Furthermore, in the electronic component 1 according to the first embodiment, the two first side surfaces 11 and 12 are present so as to oppose each other. The outer conductor 30 is present on the first side surface 11 side and the outer conductor 40 is present on the first side surface 12 side, the outer conductors 30 and 40 are embedded in the element body 10 so as to be exposed across the first side surfaces 11 and 12, respectively, and the mounting surface 17. In this case, both sides above the outer conductors 30 and 40 projecting from the upper surface 18 can be reduced or suppressed, and thus the occurrence of the failure during mounting can be further reduced. Additionally, by arranging the mounting surface 17 on the mounting substrate so as to oppose each other, the outer conductors 30 and 40 can be connected to the mounting substrate, and thus the electronic component 1 can be made as a surface-mounted type component.

The above first embodiment describes an example in which the electronic component 1 includes the outer conductors 30 and 40 having the cross-sectional shapes of the substantially L shape embedded in the element body so as to be exposed across the first side surfaces 11 and 12 and the mounting surface 17.

However, the present disclosure is not limited thereto, an outer conductor may have a shape without the second portions 32 and 42, in other words, may have a substantially plate shape provided substantially parallel to the first side surface.

Additionally, in the electronic component 1 according to the first embodiment, although the outer conductor 30 is provided such that the end portions thereof are distanced from the second side surfaces 15 and 16, the outer conductor may be exposed from the second side surfaces. In this case, a side where the main surface of the first portion of the outer conductor is exposed is defined as a first side surface, and a side where the side surface of the first portion is exposed is defined as a second side surface.

The above first embodiment describes an example in which two end surfaces substantially orthogonal to a longitudinal axis of the element body 10 are defined as the first side surfaces 11 and 12, and the electronic component 1 includes the outer conductors 30 and 40 exposed from the first side surfaces 11 and 12, respectively.

However, in the present specification, the first side surface refers to a side surface from which the outer conductor is exposed, the outer conductor is exposed from the side surface substantially parallel to the longitudinal axis of the element body 10, and the side surface substantially parallel to the longitudinal axis of the element body 10 may be defined as the first side surface.

Additionally, in the present disclosure, the first side surfaces from which the outer conductors are exposed are not necessarily two side surfaces opposing each other, the first side surface may be one side surface, and two or more outer conductors may be exposed from the one first side surface.

Additionally, in the case where one of the four side surfaces is defined as the first side surface from which the outer conductor is exposed, the first chamfered portion having the length L1 larger than the thickness Le of the outer conductor may be included only at a corner portion connecting the first side surface and the upper surface. In other words, for example, the electronic component 1 may have only one of the first chamfered portions 11*a* and 12*a*. Additionally, in this case, the configuration may be such that the chamfered portion is not included at all at the corner portion on the side without the first chamfered portion, or the chamfered portion with a length equal to or smaller than the thickness Le of the outer conductor may be included in a direction substantially orthogonal to the first side surface.

Additionally, although the electronic component 1 according to the first embodiment is configured such that the second chamfered portions 15*a* and 16*a* are included in addition to the first chamfered portions 11*a* and 12*a*, the second chamfered portions 15*a* and 16*a* are not necessary, the configuration may be such that any one or both of the second chamfered portions 15*a* and 16*a* are not included. Additionally, in this case, the configuration may be such that the chamfered portion is not included at all at a corner portion without the second chamfered portion, or a chamfered portion with a length equal to or smaller than the gap x between the end portion of the outer conductor and the second side surface may be included in a direction substantially orthogonal to the second side surface.

Additionally, as illustrated in FIG. 2A, the first embodiment describes an example in which the electronic component 1 includes the first mounting side chamfered portions 11*c* and 12*c* and the second mounting side chamfered portions 15*c* and 16*c* on the mounting surface 17 side.

However, in the present disclosure, the mounting side chamfered portion may not be included on the mounting surface 17 side, in the case where the mounting side chamfered portion is not included on the mounting surface 17 side, tilting of the electronic component during mounting can be more effectively prevented. Furthermore, the configuration may be such that only some of the mounting side chamfered portions of the first mounting side chamfered portions 11*c* and 12*c* and the second mounting side chamfered portions 15*c* and 16*c* are included on the mounting surface 17 side. Additionally, in this case, the configuration may be such that the chamfered portion is not included at all at a corner portion without the mounting side chamfered portion, or the chamfered portion having a length equal to or greater than the length L1 or equal to or greater than the length L2 may be included.

As described above, according to the electronic component 1 of the first embodiment, the electronic component capable of reducing the occurrence of the failure during mounting can be provided.

Second Embodiment

Figure 3:
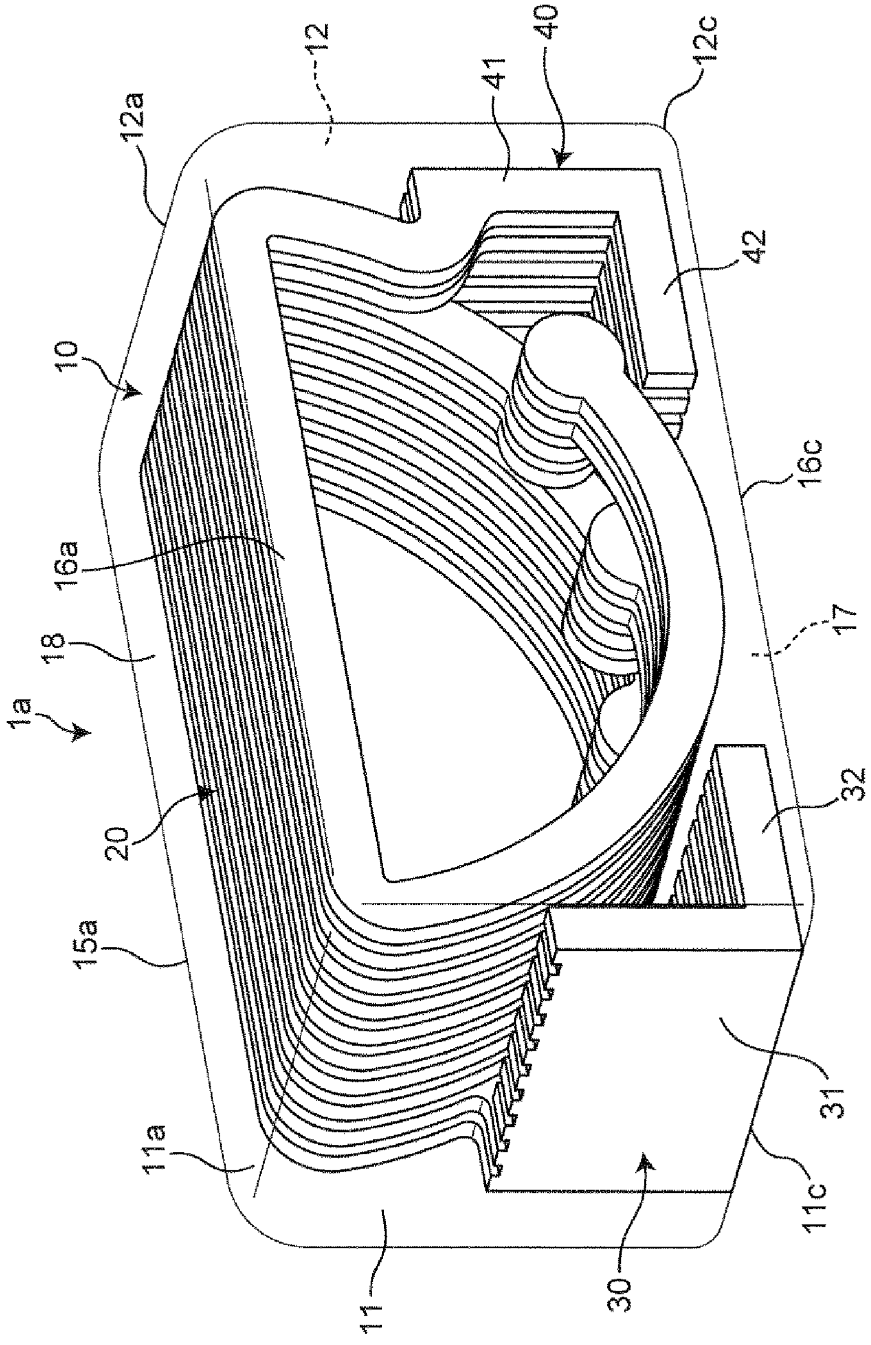
FIG. 3 is a see-through perspective view of a multilayer type coil component according to a second embodiment.

FIG. 3 is a see-through perspective view illustrating the configuration of a multilayer type coil component 1*a* according to a second embodiment of the present disclosure. The multilayer type coil component 1*a* according to the second embodiment specifies concretely an internal structure in the electronic component 1 according to the first embodiment, and has the same outer shape configuration as that of the electronic component 1 according to the first embodiment. According to the multilayer type coil component 1*a* of the second embodiment, therefore, the multilayer type coil component capable of reducing occurrence of failure during mounting can be provided.

Hereinafter, the multilayer type coil component 1*a* according to the second embodiment will be described. Note that, the configurations of the chamfered portions on the upper surface side and the mounting surface side are the same as those of the electronic component 1 according to the first embodiment, and thus detailed descriptions thereof will be omitted.

As illustrated in FIG. 3, the multilayer type coil component 1*a* according to the second embodiment further includes a coil 20 having a substantially spiral shape embedded in the element body 10 and connecting the outer conductor 30 and the outer conductor 40, in addition to the element body 10 and the outer conductors 30 and 40 embedded in the element body 10. In FIG. 3, although the element body 10 is transparently drawn, the element body 10 may be translucent or opaque.

In the multilayer type coil component 1*a*, the element body 10 has a configuration in which a plurality of insulating layers are laminated. The insulating layer is formed from a material having borosilicate glass as a primary component, a material such as ferrite, or the like for example. The element body 10 is formed having a substantially rectangular parallelepiped shape. Surfaces of the element body 10 include the first side surface 11, the first side surface 12 opposing the first side surface 11, the second side surfaces 15 and 16 adjacent to the first side surfaces 11 and 12, the mounting surface 17, and the upper surface 18 opposing the mounting surface 17.

A lamination direction of the plurality of insulating layers is substantially parallel to the first side surfaces 11 and 12, the mounting surface 17, and the upper surface 18, and substantially orthogonal to the second side surfaces 15 and 16. Note that, “parallel” and “orthogonal” herein are not strict, and may be substantial.

The outer conductors 30 and 40 are configured of a conductive material such as Ag, Cu, Au, an alloy thereof, or the like, for example. The outer conductor 30 has a substantially L shaped cross section provided so as to be exposed across the first side surface 11 and the mounting surface 17. The outer conductor 40 has a substantially L shaped cross section provided so as to be exposed across the first side surface 12 and the mounting surface 17. The outer conductors 30 and 40 have a configuration in which a plurality of conductor layers having a substantially L shape embedded in the insulating layer of the element body 10 are laminated. The plurality of conductor layers may be laminated so as to be in direct contact with one another, the plurality of conductor layers may be connected to one another by a conductor layer or a via conductor passing through the insulating layers, or may be laminated in the lamination direction with the insulating layer interposed therebetween.

The coil 20 is configured of a conductive material such as Ag, Cu, Au, an alloy thereof, or the like, for example. The coil 20 is wound along the lamination direction of the insulating layer, having a substantially spiral shape. One end of the coil 20 is connected to the outer conductor 30, the other end of the coil 20 is connected to the outer conductor 40.

An axis of the substantially spiral shape of the coil 20 is substantially parallel to the first side surface 11, the first side surface 12, and the mounting surface 17. By employing this configuration, eddy current loss which occurs due to a magnetic flux produced by the coil 20 can be reduced as this magnetic flux is blocked by the outer conductors 30 and 40.

The coil 20 has a plurality of coil conductor layers respectively wound on the plurality of insulating layers, and the via conductor passing through the insulating layers in a thickness direction and connecting end portions of the coil conductor layers adjacent to each other in the lamination direction. In this manner, the coil component 1*a* is a multilayer type coil component in which the coil 20 having the substantially spiral shape including the plurality of coil conductor layers is configured. Note that, the coil conductor layers have the substantially spiral shapes winding on the same trajectory, when viewed from the axis direction, and the coil 20 has a substantially helical shape. Accordingly, a large inner diameter of the coil 20 can be ensured, and thus a Q value can be improved. Note that, the coil 20 may have a substantially spirally wound shape by the coil conductor layer being wound on the insulating layer exceeding a single turn. With this, acquisition efficiency of an L value with respect to the number of the coil conductor layers is improved.

The multilayer type coil component 1*a* according to the second embodiment configured as described above is electrically connected to wiring of a circuit substrate, which is not illustrated, with the outer conductors 30 and 40 interposed therebetween. This multilayer type coil component 1*a* is, for example, used as an impedance matching coil of a high-frequency circuit (matching coil), used for an electronic device such as a personal computer, a DVD player, a digital camera, a TV, a cellular phone, car electronics, a medical or industrial machine, or the like. Note that, the application of the coil component 1*a* is not limited thereto, the coil component can be used for a tuning circuit, a filter circuit, a rectifying and smoothing circuit, or the like, for example.

As a constituent material of the element body in the multilayer type coil component 1*a* according to the above-described second embodiment, the material having borosilicate glass as a primary component, the material such as ferrite, or the like are described as an example. However, the present disclosure is not limited to the glass or the ceramic material, the material may be an organic material such as epoxy resin, fluororesin, and polymer resin, or may be a composite material such as glass epoxy resin. It goes without saying that the constituent material of the element body is desirably a material with a low dielectric constant and low dielectric loss.

However, in the case where the element body is formed from the glass or the ceramic material, a manufacturing process normally includes a firing process, which is liable to produce substantial irregularities at the corner portion of the element body. Accordingly, the configuration satisfying a relationship between the length L1 and the thickness Le is particularly effective.

Note that, in the case where the element body is formed from the organic material or the composite material, although there is a possibility that firing is not performed when manufacturing, even in this case, due to a difference of an expansion coefficient with respect to heat between the material of the element body and the conductor material, stress acts on the vicinity of the corner portion connecting the first side surface from which the outer conductor is exposed and the upper surface, so there is a risk that the vicinity of the corner portion becomes fragile. Accordingly, even in this case, by a relationship between the length L1 of the first chamfered portion and the thickness Le of the first portion of the outer conductor, the configuration to reduce load by the mounter nozzle concentrating on the corner portion connecting the first side surface and the upper surface when mounting is effective, the occurrence of the failure during mounting can be reduced.

Meanwhile, although the second embodiment describes, as an example of the electronic component, a coil component further including the coil 20 having the substantially spiral shape embedded in the element body 10 and electrically connecting the outer conductors 30 and 40, the disclosure is not limited thereto, the electronic component may be a capacitor component or a composite component of a coil and a capacitor. Note that, in the case where the electronic component includes a coil, in order to reduce parasitic capacitance of the coil and the outer conductor, the outer conductor is not provided on the upper surface side of the element body in many cases, the configuration satisfying the relationship between the length L1 and the thickness Le is particularly effective.

Working Example

The present working example describes a method for manufacturing the multilayer type coil component 1*a* according to the second embodiment.

Step 1

First, insulating paste having borosilicate glass as a primary component is repeatedly applied on a base material such as a carrier film or the like by screen printing so as to form an insulating paste layer. The insulating paste layer serves as an outer layer insulating layer located further in an outer side portion than the coil conductor layer. Note that, peeling the base material from the insulating paste layer in any desired process makes it possible to make the coil component 1*a* thinner.

Step 2

A photosensitive conductive paste layer is applied and formed on the insulating paste layer so as to simultaneously form the coil conductor layer and an outer conductor layer through a photolithography process.

Specifically, the photosensitive conductive paste having Ag as a primary metal component is applied on the insulating paste layer by screen printing so as to form the photosensitive conductive paste layer. Then, a photomask which has a translucent portion having a shape corresponding to the coil conductor layer and the outer conductor layer is arranged above the photosensitive conductive paste layer, the photosensitive conductive paste layer is irradiated with the ultraviolet rays or the like through the photomask, and then developed using an alkali solution or the like. The coil conductor layer and the outer conductor layer are formed on the insulating paste layer as a result. A desired conductor pattern can be drawn on the photomask.

Step 3

An insulating paste layer which is provided with an opening on the outer conductor layer and provided with a via hole on the end portion of the coil conductor layer is formed through a photolithography process. Specifically, photosensitive insulating paste is applied and formed through screen printing so as to cover the coil conductor layer and the outer conductor layer. Furthermore, a photomask which has a translucent portion at a location corresponding to a location on the outer conductor layer and the end portion of the coil conductor layer is arranged above the photosensitive insulating paste layer, the photosensitive insulating paste layer is irradiated with the ultraviolet rays or the like through the photomask, and then developed using an alkali solution or the like. The photosensitive insulating paste layer provided with the opening and the via hole can be formed as a result.

Step 4

The coil conductor layer and the outer conductor layer are formed in the opening, in the via hole, and on the insulating paste layer through photolithography process.

Specifically, photosensitive conductive paste having Ag as a primary metal component is applied and formed in the opening, in the via hole, and on the insulating paste layer through screen printing. Furthermore, a photomask which has a translucent portion having a shape corresponding to the coil conductor layer and the outer conductor layer is arranged above the photosensitive conductive paste layer, the photosensitive conductive paste layer is irradiated with the ultraviolet rays or the like through the photomask, and then developed using an alkali solution or the like. As a result, the conductor layer connecting between the outer conductor layers is formed in the opening, the via hole conductor is formed in the via hole, and the coil conductor layer and the outer conductor layer are formed on the insulating paste layer.

By repeating the above-described Step 3 and Step 4, the coil in which the coil conductor layers having a substantially spiral shape are connected with the insulating paste layer interposed therebetween and the outer conductor in which the outer conductor layers are integrated are formed. Note that, the coil conductor layers are formed with a pattern so as to be connected to the outer conductor layer at least in the lowermost layer and the uppermost layer thereof. The coil and the outer conductor are connected as a result.

Step 5

The insulating paste is repeatedly applied on the photosensitive insulating paste layer including the coil conductor layer and the outer conductor layer through screen printing so as to form the insulating paste layer. The insulating paste layer serves as the outer layer insulating layer located further in an outer side portion than the coil conductor layer portion.

Through the process described above, a mother multilayer body is obtained. Note that, from the standpoint of manufacturing efficiency, the mother multilayer body is formed such that a plurality of multilayer body chip portions including the coil and the outer conductor connected by the coil are arranged in a matrix form.

Step 6

The mother multilayer body is cut into a plurality of unfired multilayer body chips (raw multilayer body chip) with a dicing machine or the like (cutting process).

In the cutting process of the mother multilayer body, the outer conductor is exposed from the raw multilayer body chip on a cut surface formed by cutting.

Step 7

The unfired raw multilayer body chip is fired under predetermined conditions to obtain the multilayer body chip. At this time, the insulating paste layer serves as the outer layer insulation layer, the photosensitive insulating paste layer serves as the insulating layer.

Step 8

The multilayer body chip after firing is subjected to barrel finishing.

At this time, on the corner portion of the element body on the mounting surface side, the outer conductor is embedded in the element body so as to be exposed across the first side surface of the multilayer body chip and the mounting surface. In this case, as the outer conductor is more rigid than the insulating layer, a chamfered amount by the barrel finishing becomes small on the mounting surface side, and thus lengths L1, L2, L3, and L4 (see the description of the first embodiment and FIG. 2A and FIG. 2B) which define the chamfer width can satisfy L1>L2 and L3>L4 with ease. Note that, at this time, it is preferable that the gap x between the end portion of the outer conductor and the second side surface be smaller than the length L3, that is, the second chamfered portion be formed so as to exceed the end portion of the outer conductor. Through this, the outer conductor is more rigid than the insulating layer, the chamfered amount by the barrel finishing becomes small on the mounting surface side, and thus L3>L4 can be satisfied with ease.

Step 9

The portions of the outer conductor exposed from the multilayer body chip are plated with Ni at a thickness of about 2 μm to 10 μm, and then plated with Sn at a thickness of about 2 μm to 10 m on the Ni plating.

Through the above-described processes, the multilayer type coil component according to the working example having the dimension of about 0.4 mm×0.2 mm×0.2 mm is manufactured.

The formation of the coil conductor layer in the above-described Steps 2 and 4 is not limited to the above method. For example, the coil conductor layer may be formed using a printing lamination method of the conductor paste using a screen plate opened to have a pattern shape of the coil conductor layer, may be formed using a method of forming a pattern of a conductor film formed by a sputtering method, a deposition method, foil pressure bonding, or the like, by etching, or may be formed using a method in which, as in a semi-additive method, a negative pattern is formed on a plating film which serves as a power supply film, a conductor film is formed on the part of the plating film in which the negative pattern is not formed, and then unnecessary portions of the plating film and the negative pattern are removed.

Additionally, the material configuring the coil conductor layer is not limited to Ag, another metal such as Cu, Au, or the like may be used.

Additionally, the method for forming the insulating paste layer in Steps 1 and 3 is not limited to the screen printing method, the insulating paste layer may be formed by pressure bonding of an insulating material sheet, spin coating, spray application, or the like.

Furthermore, the formation of the via hole in Step 3 is not limited to the photolithography method, a laser or a drilling process may be used.

Additionally, in Step 9, although the surface of the outer conductor exposed by cutting is directly plated to form the Ni plating layer and the Sn plating layer, the present disclosure is not limited thereto. An outer electrode may be formed on the surface of the outer conductor exposed by cutting by further dipping using the conductor paste, a sputtering method, or the like, and then plated thereon.

In the above-described working example, the chamfered portion is formed by the barrel finishing after firing. Through this, as illustrated in FIGS. 1 to 3, the chamfered portion, which is so-called R-chamfered, having a substantially circular arc cross section is formed. Additionally, by the barrel finishing, a chamfered portion smaller than the chamfered portion on the upper surface side is formed on the mounting surface side from which the outer conductor is exposed as well.

However, in the present disclosure, including before firing, the chamfered portion may be formed, for example, by a photolithography method, a drilling process, a laser process, a blasting method, or the like, or the chamfered portion may be formed such that grooves with a width wider than a thickness of a dicing blade are formed and cut, along cut lines when dividing the mother multilayer body into individual multilayer bodies, for example.

This makes it possible to form chamfered portions having various shapes.

In other words, the chamfered portions according to the present disclosure include chamfered portions of various shapes described below as examples.

(1) A chamfered portion having a cross section of a substantially curved line shape expanding toward an outer side portion (R-chamfered portion), as illustrated in FIGS. 1 to 3.

(2) A chamfered portion having a shape obtained by substantially linearly and obliquely cutting off a corner portion (C-chamfered portion).

(3) A chamfered portion having a cross section of a substantially curved line shape recessed toward an inner side portion.

Additionally, according to a method for forming the chamfered portion by forming grooves along the cut lines in the mother multilayer body, it is possible to form the chamfered portion only on the upper surface side without forming the chamfered portion on the mounting surface side. This makes it possible to prevent more effectively tilting during mounting.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:

an element body having a mounting surface, an upper surface opposing the mounting surface, a first side surface, and a second side surface adjacent to the first side surface; and an outer conductor including a first portion extending along the first side surface and embedded in the element body so as to be exposed from the first side surface, wherein the outer conductor has a uniform width from a lowermost edge to an uppermost edge, the outer conductor is provided such that an end portion of the outer conductor is distanced from the second side surface, a gap x between the end portion and the second side surface is equal to or smaller than about 30 μm, wherein the element body has a chamfered portion at an edge portion connecting the upper surface and the second side surface, the element body has a mounting side chamfered portion at an edge portion connecting the second side surface and the mounting surface, and a length L3 of the chamfered portion is longer than a length L4 of the mounting side chamfered portion in a direction substantially orthogonal to the second side surface.

2. The electronic component according to claim 1, wherein the gap x is equal to or smaller than about 20 μm.

3. The electronic component according to claim 1, wherein the gap x is equal to or greater than about 3 μm.

4. The electronic component according to claim 1, wherein the gap x is equal to or greater than about 5 μm.

5. The electronic component according to claim 1, wherein the length L4 of the mounting side chamfered portion is shorter than the gap x in the direction substantially orthogonal to the second side surface.

6. An electronic component comprising:

an element body having a mounting surface, an upper surface opposing the mounting surface, a first side surface, and a second side surface adjacent to the first side surface; and an outer conductor including a first portion extending along the first side surface and embedded in the element body so as to be exposed from the first side surface, wherein the outer conductor has a uniform width from a lowermost edge to an uppermost edge, the outer conductor is provided such that an end portion of the outer conductor is distanced from the second side surface, the element body has a mounting side chamfered portion at an edge portion connecting the second side surface and the mounting surface, the element body has a chamfered portion at an edge portion connecting the upper surface and the second side surface, a length L4 of the mounting side chamfered portion is shorter than a gap x between the end portion and the second side surface in a direction substantially orthogonal to the second side surface, and a length L3 of the chamfered portion is longer than the length L4 of the mounting side chamfered portion in the direction substantially orthogonal to the second side surface.

7. The electronic component according to claim 6, wherein the gap x is equal to or smaller than about 30 μm.

8. The electronic component according to claim 6, wherein the gap x is equal to or smaller than about 20 μm.

9. The electronic component according to claim 6, wherein the gap x is equal to or greater than about 3 μm.

10. The electronic component according to claim 6, wherein the gap x is equal to or greater than about 5 μm.

* * * * *